United States Patent
Chun et al.

(10) Patent No.: US 8,419,881 B2
(45) Date of Patent: Apr. 16, 2013

(54) METHOD FOR MANUFACTURING HOLLOW COMPOSITE STRUCTURE

(75) Inventors: Heoung Jae Chun, Seoul (KR); Wook Jin Na, Seongnam (KR)

(73) Assignees: Hyundai Motor Company, Seoul (KR); Industry-Academic Cooperation Foundation, Younsei University, Seodaemun-gu (KR)

( * ) Notice: Subject to any disclaimer, the term of this patent is extended or adjusted under 35 U.S.C. 154(b) by 0 days.

(21) Appl. No.: 12/950,842

(22) Filed: Nov. 19, 2010

(65) Prior Publication Data

US 2012/0043013 A1  Feb. 23, 2012

(30) Foreign Application Priority Data

Aug. 31, 2010  (KR) ........................ 10-2010-0084521

(51) Int. Cl.
*B29C 65/70* (2006.01)
*B29C 43/36* (2006.01)

(52) U.S. Cl.
USPC ........... 156/245; 156/156; 156/278; 156/287; 264/225; 264/545; 264/552; 264/573; 425/389; 425/405.1

(58) Field of Classification Search ............ 156/156, 156/287; 264/545, 552, 572, 225, 573; 425/389, 425/393

See application file for complete search history.

(56) References Cited

U.S. PATENT DOCUMENTS

| | | | | |
|---|---|---|---|---|
| 3,542,900 A | * | 11/1970 | Lammers | 525/446 |
| 4,107,254 A | * | 8/1978 | Webster et al. | 264/270 |
| 5,505,492 A | * | 4/1996 | Nelson et al. | 280/819 |
| 5,557,982 A | * | 9/1996 | Voss et al. | 74/551.1 |
| 2004/0183227 A1 | * | 9/2004 | Velicki et al. | 264/236 |
| 2008/0182054 A1 | * | 7/2008 | Ridges et al. | 428/35.2 |

FOREIGN PATENT DOCUMENTS

| | | |
|---|---|---|
| JP | 60176746 A * | 9/1985 |
| JP | 06-121852 | 5/1994 |
| JP | 06-142243 | 5/1994 |
| JP | 09-048062 | 2/1997 |
| JP | 10-217321 | 8/1998 |
| KR | 10-2002-0039438 | 5/2002 |

* cited by examiner

*Primary Examiner* — William Bell
(74) *Attorney, Agent, or Firm* — Edwards Wildman Palmer LLP; Peter F. Corless

(57) ABSTRACT

The present invention provides a method for manufacturing a hollow composite structure by forming a prepreg product using a plurality of prepregs, forming a soft coating layer on an inner surface of the prepreg product, and compressing the prepreg product by applying pressurized air to the coating layer and, at the same time, applying heat to the prepregs.

10 Claims, 6 Drawing Sheets

PRIOR ART

METHOD FOR MANUFACTURING HOLLOW COMPOSITE STRUCTURE

CROSS-REFERENCE TO RELATED APPLICATION

This application claims under 35 U.S.C. §119(a) the benefit of Korean Patent Application No. 10-2010-0084521 filed Aug. 31, 2010, the entire contents of which are incorporated herein by reference.

BACKGROUND (a) Technical Field

The present disclosure relates to a method for manufacturing a hollow composite structure, particularly by air pressure without a tube. More particularly, it relates to a method for manufacturing a hollow composite structure by forming a prepreg product using a plurality of prepregs, forming a soft coating layer on an inner surface of the prepreg product, and compressing the prepreg product by applying pressurized air to the coating layer and, at the same time, applying heat to the prepregs.

(b) Background Art

Prepreg is a term for pre-impregnated fibers. A prepreg is typically a sheet-like product, in which reinforced fibers are pre-impregnated with a resin, i.e., binder, and is an intermediate product for producing a composite material product. As the reinforced fibers, carbon fibers, glass fibers, aramid fibers, etc. are mainly used. As the binder, epoxy resin, polyester resin, thermoplastic resin, etc. are typically used. A prepreg in the form of a fabric, such as cloth, can be molded into a predetermined shape by a mold, and cured to form a reinforced resin product such as a fiber-reinforced plastic (FRP).

The prepreg is formed into various products according to the type of fibers, the arrangement of fibers, and the type of binder used. The composite materials produced using the prepreg have improved properties such as strength, hardness, corrosion resistance, fatigue life, impact resistance, etc. compared to other materials.

In the automobile industry, a prepreg is mainly used in a vehicle body structure for weight reduction. For example, the prepreg is widely used in the bodies of Formula 1 racing cars, high performance homemade cars called supercars, etc. Further, prepregs are used in manufacturing vehicle interior materials, brackets, etc., and are also applied in various industries such as vehicles (including aircraft, boats, bicycles, etc.), golf clubs, high pressure containers, etc.

Examples of conventional methods for manufacturing hollow composite structures using a prepreg will be described below.

According to an autoclave molding method, a plurality of prepregs are stacked in a mold, the resulting mold is placed in a vacuum bag which is then sealed from the outside, a gas pressure is applied externally to the vacuum bag, a vacuum state is maintained in the vacuum bag by an external vacuum pump to remove volatile components generated from a resin impregnated in the product, thereby removing gaps between the respective prepregs to completely bond the prepregs.

According to a filament winding molding method, a fiber reinforced material is passed through a resin mixture and is continuously wound in the form of a filament on a cylindrical mandrel rotating in a wet state to be molded. This method is generally used to manufacture a hollow product such as a pipe, cylinder, etc. and can be used to manufacture products having various sizes such as a storage tank having a diameter of 6 m, motor having a diameter of 2.5 m, etc. In the filament winding molding method, it is necessary to properly control the way in which the filament moves, the winding angle, the left and right rotational movement of the mandrel, etc. Using a filament winding molding method, it is possible to manufacture products having a uniform thickness in mass production. After the fibers are molded, a model is molded using an autoclave or hot press.

According to a thermal expansion molding method, a prepreg is disposed in a mold and a silicon block also disposed in the mold is expanded at a temperature higher than the deformation temperature of the resin such that the prepreg is compressed. In particular, the prepreg is placed in a preheated mold having a predetermined shape, and is the prepreg is then compressed at high temperature and high pressure to produce a product. Using a thermal expansion molding method, it is possible to produce a product having a complicated shape within a short period of time.

According to an air compression molding method, an example of which is shown in FIG. 1, a sheet-like prepreg 6 is located in a mold 2 and heat is applied to the mold 2 using a heater. When heat at a predetermined temperature is applied to the mold 2, a tube 4 in the mold 2 expands to pressurize the prepreg 6.

In addition to the air compression molding method by heating shown in FIG. 1, the air may be pressurized to a tube to be expanded as shown in FIG. 2. In particular, as shown, a prepreg 5 is wound on a mandrel 7 in a rectangular tube shape, the resulting mandrel 7 is placed in a preheated mold 1, the mold 1 is closed such that the mandrel 7 (i.e., air tube) is expanded to pressurize the prepreg 5. When the prepreg 5 is completely cured, the mandrel 7 disposed therein is removed to complete the molding process.

For example, in Korean Patent Application No. 10-1994-0021050 describes one method for manufacturing a cylindrical composite material structure using a 2-piece mold, wherein a prepreg is stacked and fixed in a lower mold, pressurized by a nylon bladder that is expanded, and then cured.

According to Koran Patent Application No. 10-1992-0008038, a bicycle body formed using a composite material and a method for manufacturing the same is described. In particular, an air injector is inserted into a hole formed in a mold so as to penetrate a composite material layer, an airtight tube and a sealing member disposed in the tube supply compressed air thereto such that the composite material comes into close contact with an external mold, and the composite material is then cured.

According to Korean Patent Publication No. 10-2002-0016780, a hollow composite product and a method for manufacturing the same is described. In particular, a laminate is wound on a mandrel and placed in a preheated mold to be molded. After the mold is assembled, a pump is used to apply pressure to and expand a pocket disposed in the mold, thereby forming a rectangular composite tube.

According to U.S. Pat. No. 5,853,651, a high pressure hollow process for manufacturing composite structures is described. A mandrel made of thermoplastic material, such as polystyrene or acrylonitrile-butadiene-styrene co-polymer (ABS), having a laminate provided thereon is placed in a mold, and is heated and inflated to a predetermined pressure. When the laminate is completely cured, the mandrel disposed therein is removed to complete the molding process.

However, according to the above-described conventional air compression molding methods, the tube for compression molding of the prepreg is pre-formed into a shape that matches the frame of the mold, thus requiring a long manufacturing time which reduces productivity. Moreover, since the pre-formed tube can only be suitably used with a mold having a corresponding predetermined shape, use of the pre-formed tube is limited. Furthermore, to manufacture a plurality of hollow structures of various shapes, a variety of corresponding tubes for forming the various shapes must be prepared in advance. Further, when using a complicated mold, it is difficult to prepare the corresponding tube. Thus, manufacturing time and costs significantly increase, and competitiveness of the product is decreased. In addition, it is very difficult to apply a uniform pressure to all surfaces, such as corners and curves, of a complicated inner surface shape through use of the tube (as depicted, for example, in FIG. 3), and thus it is difficult to ensure uniform quality of the end product.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for manufacturing a hollow composite structure having a predetermined shape. In particular, a method in accordance with an embodiment of the present invention includes: forming a prepreg product, preferably from a plurality of prepregs; providing a coating layer, preferably a soft/flexible coating layer (it is noted that the layer is generally described herein as "soft", but it is to be understood herein that such layers are also flexible), on the inner surface of the prepreg product by applying a suitable coating material to the entire inner surface of the prepreg product; pressurizing the inner surface of the prepreg product by air pressure, wherein application of pressurized air to the coating layer compresses the prepreg product and, at the same time, applying heat to the prepregs.

In accordance with one embodiment, the present invention provides a method for manufacturing a hollow composite structure by use of air pressure and without a tube. In particular, according to this embodiment the method includes: forming a prepreg product using a plurality of prepregs; forcibly inserting a silicon block into an open area of the prepreg product, thereby sealing the prepreg product; forming an inner coating layer by applying a coating material to the inside of the prepreg product; and compressing the prepreg product by applying pressurized air to the coating layer of the prepreg product, which has been inserted into a mold, and, at the same time, applying heat to the prepregs.

In a preferred embodiment, the prepreg product may be formed by winding or stacking the prepregs on the surface of a core having a predetermined shape, such that the wound or stacked prepregs are pre-formed into the desired hollow shape. The core is subsequently removed after appropriate process steps have been carried out, to thereby form the hollow composite structure.

In another preferred embodiment, the prepreg product is formed by stacking the prepregs in the mold, e.g. in the desired hollow shape.

In still another preferred embodiment, the coating material may comprise at least one of silicon, latex, soft resin, and mixtures thereof.

In yet another preferred embodiment, during formation of the coating layer, water and/or heat (e.g. at a temperature of about 25 to 90° C.) is applied to the coating material to reduce the curing time of the coating material.

In a preferred embodiment, the method further includes inserting a nozzle into through holes formed in the mold and in the silicon block, and injecting the coating material and/or or air via the nozzle. In a further preferred embodiment, the nozzle is formed of a rubber material that closely adheres to the through holes (e.g. so as to reduce or remove gaps between the nozzle and the through holes, and thereby prevent leakage of coating material and/or air). In another further preferred embodiment, one or more sealing members are disposed between the mold and the nozzle (e.g. in a gap between the nozzle and mold) to prevent the injected coating material and/or air from leaking.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
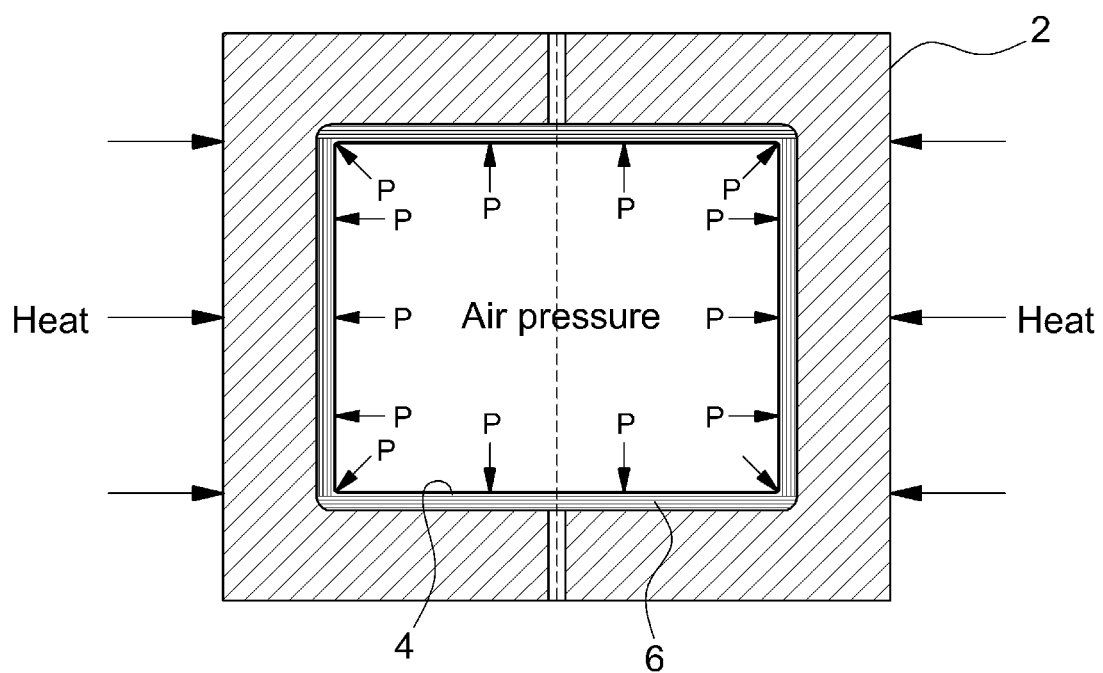
FIG. 1 is a schematic cross-sectional view showing a conventional air compression molding method.
Figure 2:
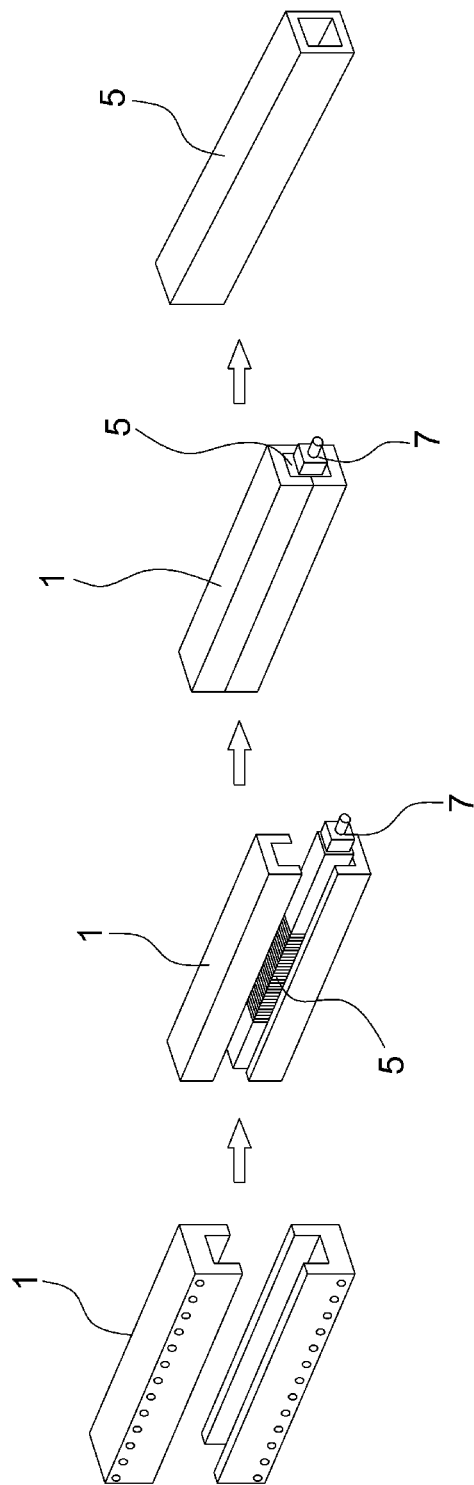
FIG. 2 is a schematic diagram showing a process of manufacturing a hollow composite structure by a conventional air compression molding method.

Reference numerals set forth in the Drawings includes reference to the following elements as further discussed below:

| | |
|---|---|
| 10: mold | 11: through hole in mold |
| 20: prepreg product | 21: silicon block |
| 21a: through hole in silicon block | 30: coating layer |
| 40: nozzle | 50: sealing member |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a method for manufacturing a hollow composite structure, which can be used in a vehicle body and the like. According to the present invention, one or more prepregs are provided in a desired hollow shape (inside or outside of a mold), and a coating material is applied along the inner surface of the prepregs to form a coating layer. Air pressure is applied to pressurize the coated prepregs, and thereby form the hollow composite structure.

In particular, according to a preferred embodiment, a soft airtight coating layer is formed on the inner surface of a prepreg product, and the prepreg product is uniformly pressurized by air pressure to form the hollow composite structure. Thus, for example, an airtight coating layer applied to the inner surface of a prepreg product can be used instead of a pre-formed tube for pressurizing the inner surface of the prepreg product.

Figure 4:
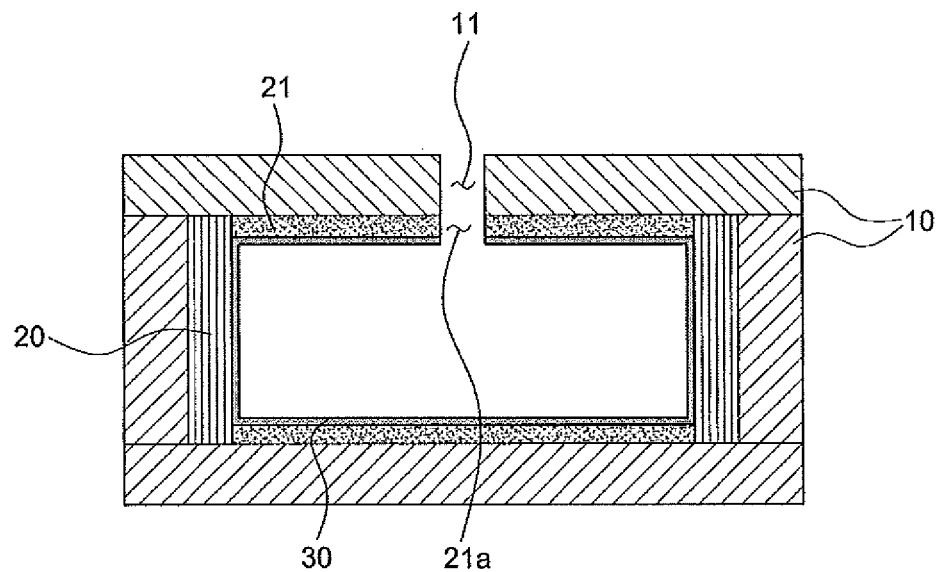
FIG. 4 is a schematic diagram showing a state in which one side of a mold and a silicon block are perforated during a process of manufacturing a hollow composite structure in accordance with a preferred embodiment of the present invention.
Figure 5:
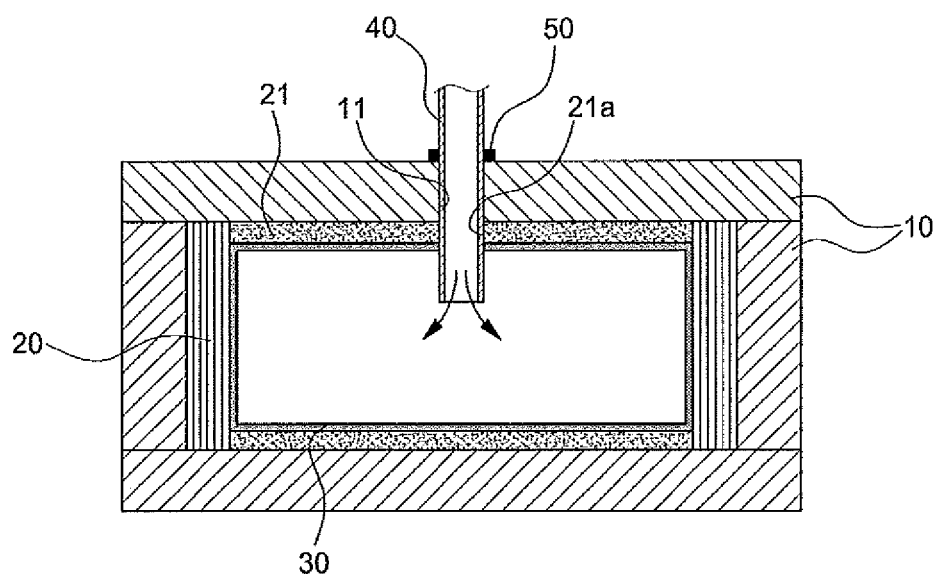
FIG. 5 is a longitudinal cross-sectional view showing a state in which a nozzle is inserted into through holes of a mold and a silicon block in accordance with a preferred embodiment of the present invention.
Figure 6:
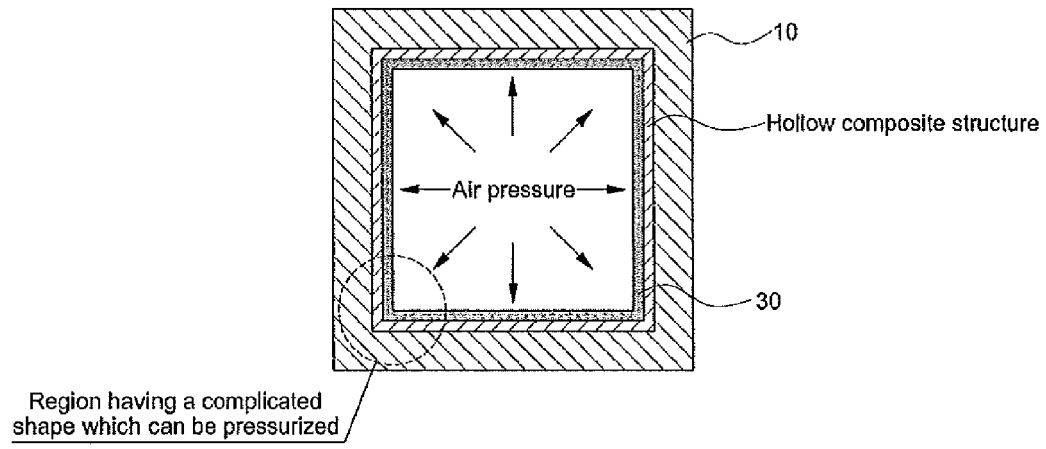
FIG. 6 is a schematic diagram showing that an internal pressure is uniformly applied to complicated regions during a process of manufacturing a hollow composite structure in accordance with a preferred embodiment of the present invention.

According to preferred embodiments of the present invention, for example as shown in FIGS. 4-6, a hollow composite structure is manufactured by forming a prepreg product 20 (e.g. within a mold 10 using a plurality of prepregs or outside of a mold using a plurality of prepregs), forming a coating layer 30 by applying a coating material to the inner surface of the prepreg product 20 and curing as necessary, and compressing the prepreg product 20 by applying pressurized air to the cured coating layer 30 and, at the same time, applying heat to the prepregs.

According to the present invention, formation of the prepreg product 20 is not particularly limited. For example, in one embodiment, the prepreg product 20 may be formed by stacking a plurality of prepregs in a mold 10 in a single or multi-layer. In another embodiment, the prepreg product 20 may be pre-formed outside the mold 10 and placed in the mold 10 after the coating material has been applied to the prepreg product 20 and cured.

In the case where the prepreg product 20 is formed in the mold 10, the hollow composite structure can be manufactured by stacking the plurality of prepregs in the mold 10 in a single or multi-layer to form the prepreg product 20, forcibly inserting a silicon block 21 (e.g. at both open ends of the prepreg product 20 as shown in FIG. 4), forming the coating layer 30 by applying a coating material to the inner surface of the prepreg product 20, and compressing the prepreg product 20 by applying pressurized air to the coating layer 30 and, at the same time, applying heat to the prepregs. It is noted that while a silicon block 21 is particularly described in connection with the present methods, any other suitable structures known in the art would also be suitable for use in the present invention In a preferred embodiment, during formation of the coating layer 30, the mold 10 may be rotated or turned in every direction as needed such that the coating material injected into the prepreg product 20 is uniformly applied to the entire inner surface of the prepreg product 20.

In other embodiments, such as when the mold 10 is heavy, it may not be easy to apply the coating material while moving the mold 10, and thus it is preferable that the prepreg product 20 be preformed outside the mold 10 and inserted into the mold 10 after the coating material has been applied to the prepreg product 20 and cured.

A method of manufacturing a hollow composite structure wherein the process of pre-forming the prepreg product 20 outside the mold 10 will be described below in accordance with one embodiment.

First, a core having a predetermined shape is prepared, and a prepreg product 20 having a desired hollow shape is formed by stacking, winding, or otherwise arranging a plurality of prepregs on the surface of the core and pressurizing the resulting structure.

Next, the prepreg product 20 is placed in a mold 10, and the core is removed from the prepreg product 20. Then, a coating material is uniformly applied to the inner surface of the prepreg product 20 to form a coating layer 30, and a silicon block 21 is forcibly inserted, e.g. at both open ends of the prepreg product 20. Alternatively, the core can first be removed from the prepreg product 20, followed by insertion of the prepreg product 20 into the mold 10. The coating layer 30 would then be formed on the inner surface of the prepreg product 20 as described.

The coating layer 30 may be formed by any known coating methods. In certain preferred embodiments, the coating layer 30 is formed by manually applying the coating material or by spraying the coating material.

In certain embodiments, up to this point the mold 10 comprises only top and bottom ends to facilitate the method steps, and at this time a side mold is fixed to both ends of the mold 10, and the resulting mold 10 is closed and sealed. Once the mold 10 is sealed, the prepreg product 20 is compressed by injecting air to the inside of the mold 10 and within the prepreg product 20, to thereby apply air pressure to the coating layer 30. Heat is also applied to the prepregs, preferably while air pressure is applied, to thereby provide the hollow composite structure.

In an embodiment wherein the prepreg product 20 is pre-formed outside the mold 10, the silicon block 21 can be forcibly inserted at both open ends of the prepreg product 20, which can cause the prepreg product 20 to expand more than the mold 10 due to a difference in thermal expansion coefficient during heating. As such, the open ends of the prepreg product 20 are pushed to the inner walls of the mold 10 with a large thermal load, which can enhance the air-tightness within the mold and facilitate a successful molding process.

Further in accordance with preferred embodiments, one or more through holes 11 and 21a are provided on one side of the mold 10 and the silicon block 21 for injecting the coating material and/or air.

A method for manufacturing a hollow composite structure in accordance with a preferred embodiment of the present invention will be described in more detail in connection with FIGS. 4 and 5. As shown, the mold 10 for manufacturing the hollow composite structure in this embodiment has a hollow portion therein and is divided into a plurality of parts or sides (e.g. top and bottom and side parts).

As shown, the through hole 11, through which the coating material and/or air is injected into the prepreg product 20 can be formed on one side of the mold 10, and a nozzle 40 can be inserted into the through hole 11. The nozzle 40 is preferably formed of a rubber or similar material, which provides close contact with the through hole 11, so as to prevent the coating material and/or air injected into the prepreg product 20 from leaking to the outside through the through hole 11. Thus, for example, while rubber is described as one preferred material, the nozzle 40 may be formed of a material other than rubber, and is preferably formed of a material that can maintain air-tightness with the through holes 11 and 21a. In certain embodiments, in order to prevent the coating material and/or air from leaking to the outside through a gap between the mold 10 and the nozzle 40, a sealing member 50 may be disposed in the gap, i.e., between the top of the through hole 11 of the mold 10 and the nozzle 40.

According to one embodiment of the present invention, wherein the above-described mold 10 is used, a plurality of sheet-like prepregs are stacked on or along the walls of the opened mold 10 in a single or multi-layer to form a hollow prepreg product 20 in the mold 10. The silicon block 21 is then forcibly inserted at both open ends of the prepreg product 20. The opened mold 10 may then be closed (e.g. by closing the top and bottom of the mold using a separate joint connecting the sides of the mold (not shown)).

Next, the through holes 11 and 21a for injecting the coating material and/or air are formed on one side of the mold 10 and the silicon block 21. Any known method for forming through holes can be used, such as using a drilling machine. For example, in certain embodiments, the mold 10 and the silicon block 21 are simultaneously perforated using the drilling machine to form the through holes 11 and 21a. In another embodiment, a mold 10 having a pre-formed through hole 11 is used, and a through hole 21a may be formed on one side of the silicon block 21 through the through hole 11 of the mold 10.

A suitable coating material is then injected into the prepreg product 20 through the through holes 11 and 21a of the mold 10 and the silicon block 21, and is uniformly applied to the entire inner surface of the prepreg product 20. The applied coating material is then cured under suitable conditions (which can be determined based on the coating material being used) to form a soft air-tight coating layer 30.

In accordance with a preferred embodiment of the present invention, the coating material is cured by applying water and/or heat at a temperature lower than the temperature at which the prepreg resin is cured and higher than room temperature (for example, temperatures ranging from about 25 to 90° C. may be suitable), such that the coating material is more strongly bonded to the composite material (prepregs). Preferably, the coating material is one which provides a high elongation and which is cured to maintain air-tightness.

In some embodiments, to inject the coating material and/or air within the mold 10 and prepreg product 20s, a nozzle 40 is inserted into the through holes 11 and 21a, and the coating material and/or air is injected into the prepreg product 20 through the nozzle 40. In accordance with certain embodiments of the present invention, use of the nozzle 40 can facilitate the injection of the coating material and/or air, thereby improving workability.

In certain embodiments, during the curing process of the coating material, it is possible to reduce the curing time by applying water and/or heat at a suitable temperature (e.g. a temperature of about 25 to 90° C.) which is lower than the temperature at which the prepreg resin is cured and higher than room temperature. For example, in embodiments of the present invention, water or heat can be applied alone or water and heat can be applied at the same time.

The prepreg product 20 is then compressed into a predetermined shape by supplying air to the inside of the mold 10 *e.g. through the through holes 11 and 21a or the nozzle 40) to thereby apply air pressure to the coating layer 30. At the same time, heat is applied to the prepregs. The hollow composite structure according to the present invention are thereby formed.

It is noted that during the compression molding process, a silicon block 21 can be forcibly inserted at both open ends of the prepreg product 20. As such, the silicon block 21 is expanded by heat to increase the air-tightness within the mold. According to the present methods, it is possible to achieve a perfect airtight state with the prepreg product 20.

After the hollow composite structure has been formed, the coating layer 30 may be separately removed or it can be left as is in the hollow composite structure.

In accordance with the present invention, a compression molding process of a prepreg product 20 may be performed by the pressurization or expansion of air injected into a coating layer 30 that coats the inner surface of the prepreg product 20. In certain embodiments a preheated mold 10 may be used or heat may be applied using a separate heater during the molding process. Further, where the prepreg product 20 is pre-formed outside the mold 10 and is subsequently placed in the mold 10, the hollow composite structure may be manufactured in the same manner as when the prepreg product 20 is formed in the mold 10, with the only difference in the processes being formation of the prepreg product 20 outside the mold 10 as opposed to inside the mold 10. Thus, for example, if the prepreg product 20 is formed outside the mold 10, then the mold 10, the nozzle 40, and the coating material may all be used in the same manner (i.e. as when the prepreg product 20 is formed within the mold 10), and the process of rotating or turning the mold 10 (which is performed when the prepreg product 20 is formed in the mold 10) may be eliminated.

According to the present invention, the coating material used in the present invention is not particularly limited, but preferably it satisfies the following conditions to more effectively perform the compression molding process of the prepreg product 20 by air pressure: (1) it should be sufficiently coated and bonded to the prepreg; (2) it should have a sufficient softness and/or flexibility such that it can be uniformly applied to the entire inner surface of the prepreg product 20; (3) it should ensure air-tightness to perform the compression molding process of the prepreg product 20 by the air pressure; and (4) it should not be melted and deformed at a high temperature of 100 to 185° C. It is further desired that the coating layer 30 formed of the coating material have a softness such that it is not damaged by air injection and pressure on the inner surface of the prepreg product 20, and that the coating layer 30 provide an air-tightness to prevent air leakage during the compression molding process of the prepreg product 20. Thus, as the coating material of the present invention, some particularly preferred materials include liquid polymer materials such as silicon, latex, soft resins, etc. or a mixture of liquid polymer materials, which satisfy the above-described conditions. In particular, it was experimentally demonstrated that silicon, latex, soft resins, and mixtures of these liquid polymer materials provide excellent properties such as softness, air-tightness, heat resistance, etc. as well as good adhesive properties to the prepreg. Further, during an air-tightness test of the coating material, air bubbles were generated when air pressure was applied to the prepreg product 20 before the coating material was applied to the prepreg product 20. However, the air bubbles were not generated after applying the coating material to the prepreg product 20 in accordance with the present methods. As such, the use of coating materials in accordance with the present invention provides an excellent alternative to the conventional use of tubes in air compression molding of prepregs.

Figure 3:
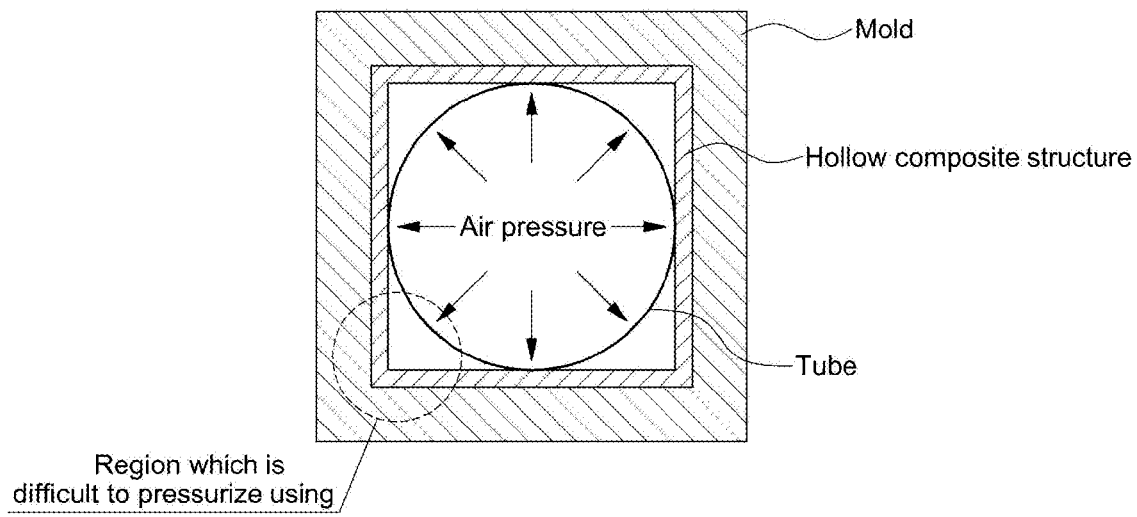
FIG. 3 is a schematic diagram showing a region in which it is difficult to perform compression molding using a tube according to a conventional air compression molding method.
Figure 7:
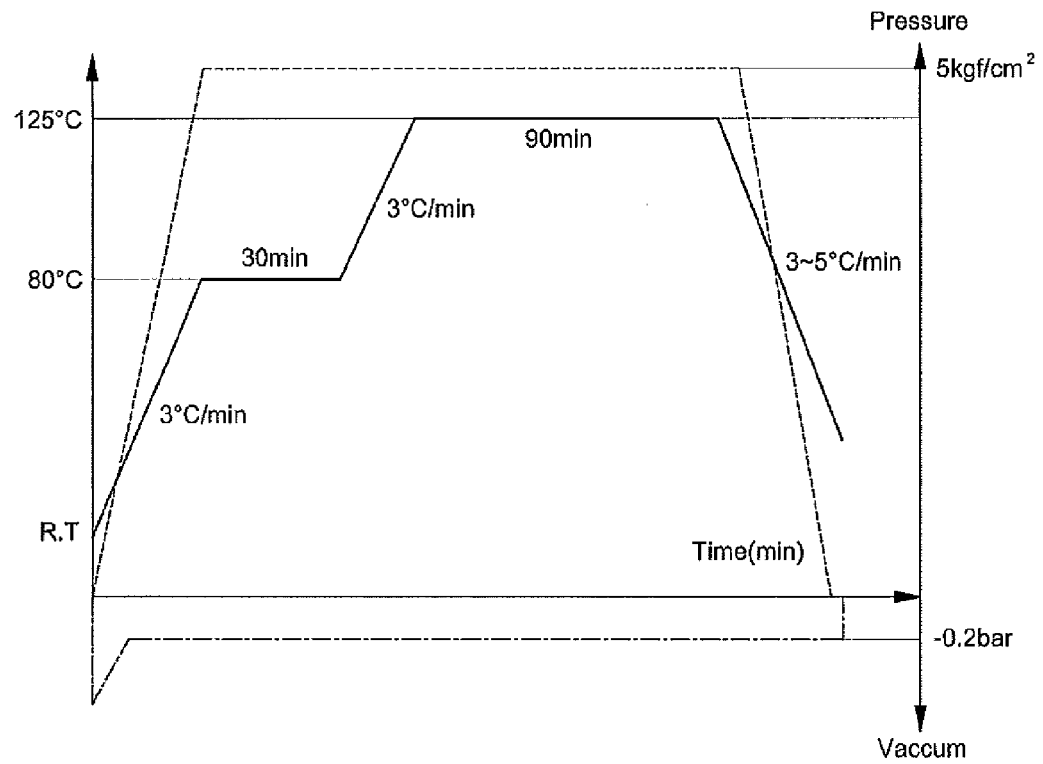
FIGS. 7 and 8 are graphs showing the cure cycle and viscosity of a hollow composite structure formed by one preferred method of the present invention.
Figure 8:
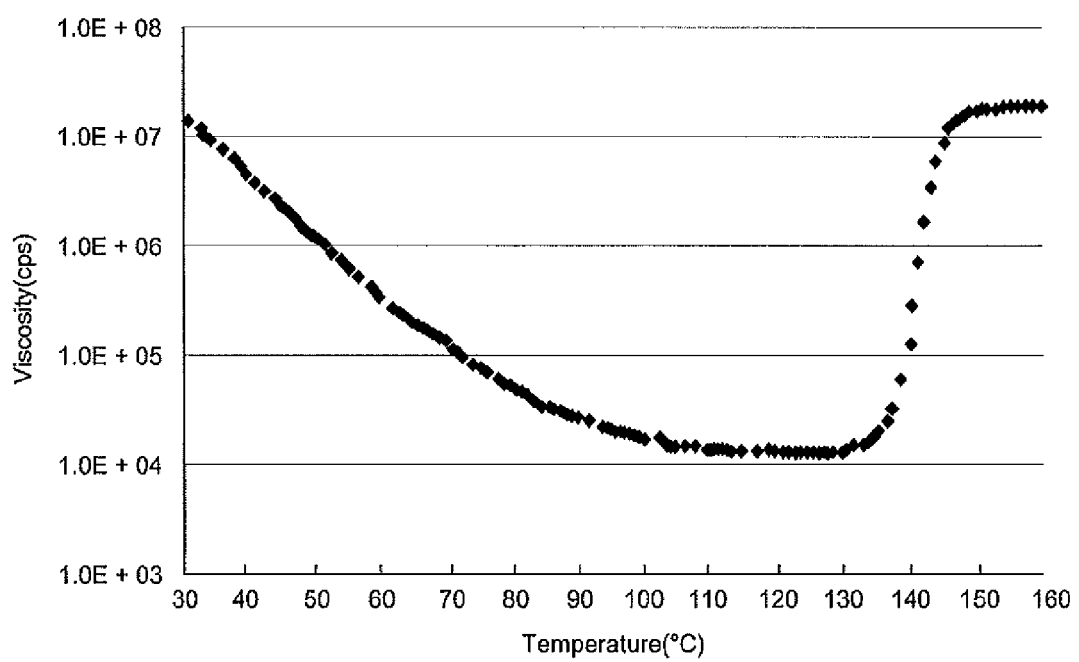

It has been found that for the optimal formation of the prepregs, the degree and duration of heat and pressure applied should be properly considered, and the temperature and pressure may be expressed as function of time, which is called a cure cycle. The cure cycle plays a crucial role in determining the quality of the product. Provided in FIGS. 7 and 8 are graphs showing the cure cycle and viscosity of hollow composite structures formed in accordance with the present invention. According to the present invention, it is not necessary to form and use a conventional tube for manufacture of a predetermined hollow composite structure (e.g. by conventional methods of disposing the tube inside the prepregs, applying pressurized air thereto to be inflated, and compressing the prepregs). Instead, according to the present invention, a soft coating material is injected into the prepreg product 20 and the coating material is uniformly coated on the entire inner surface of the prepreg product 20 and cured to thereby form a soft airtight coating layer 30. Moreover, since the coating layer 30 formed is in close contact with the prepreg product 20, regardless of the shape and structure of the prepreg product 20, it is possible to form a region where it is difficult to pressurize the mold 10 for manufacturing a hollow composite structure having a complicated shape (e.g., the corners of the inner surface of the mold, refer to FIG. 3), which improves the reliability and competitiveness of the product. Moreover, according to conventional methods, when the tube and the mold do not fit to each other, the tube is expanded such that the prepreg fibers are bent, which reduces the mechanical properties of the prepreg product. However, according to the present invention, the prepreg fibers are prevented from being bent. Further, since the airtight coating layer 30 of the present invention can uniformly apply air pressure even to a region of a complicated structure as shown in FIG. 6, the degree of precision is increased, and thus it is possible to ensure uniform quality using the present methods.

As described above, the method for manufacturing the hollow composite structure according to the present invention provides numerous advantages such as the following:

1. It is not necessary to prepare a tube to be disposed in the prepreg product, and thus the additional time and cost to prepare the tube is eliminated, even in the case where the shape of the product is different;

2. It is possible to easily form the means for pressurizing the inner surface of the prepreg product by air pressure by applying the coating material to the inner surface of the prepreg product; and 3. It is possible to manufacture a hollow composite structure having a complicated shape and, since a pressure is uniformly applied to the corners of the hollow composite structure through the soft coating layer formed on the inner surface of the prepreg product, it is possible to ensure uniform quality and increase the degree of precision, thereby improving the reliability and competitiveness of the product.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a hollow composite structure by air pressure without a tube, the method comprising:
   forming a prepreg product using a plurality of prepregs, the prepreg product having an inner surface and one or more open areas;
   sealing the prepreg product by forcibly inserting a silicone block into the open areas of the prepreg product;
   forming a coating layer by applying a coating material to the inner surfaces of the prepreg product; and
   compressing the prepreg product by applying pressurized air to the coating layer and, at the same time, applying heat to the prepreg product, wherein compressing and applying heat is carried out when the prepreg product is disposed within a mold,
   wherein one or more holes are provided in the mold and the silicone block, and wherein the coating material is applied to the inner surfaces of the prepreg product by injection of the coating material through the one or more holes.

2. The method of claim 1, wherein the prepreg product is formed by providing a core having a predetermined shape, and winding or stacking the plurality of prepregs on the surfaces of the core, and removing the core.

3. The method of claim 1, wherein the prepreg product is formed by stacking the plurality of prepregs in the mold.

4. The method of claim 1, wherein the coating material is selected from the group consisting silicone, latex, soft resin, and mixtures thereof.

5. The method of claim 1, wherein in the formation of the coating layer, water and/or heat at a temperature of about 25 to 90° C. is applied to the applied coating material to reduce curing time of the coating material.

6. The method of claim 1, further comprising providing through holes in the mold and silicone block and inserting a nozzle into the through holes, wherein the coating material and/or air are injected through the nozzle.

7. The method of claim 6, wherein the nozzle is formed of a rubber material that closely adheres to the through holes.

8. The method of claim 6, wherein a sealing member is disposed in a gap between the mold through hole and the nozzle to prevent the coating material and/or air from leaking.

9. The method of claim 1, wherein the step of forming a coating layer by applying a coating material to the inner surfaces of the prepreg product comprises applying the coating material to the inner surfaces of the prepreg product and curing the coating material.

10. The method of claim 1, wherein the coating layer is bonded to the inner surfaces of the prepreg product.

* * * * *